US012780036B2

(12) United States Patent
Bowis et al.

(10) Patent No.: US 12,780,036 B2
(45) Date of Patent: Nov. 3, 2026

(54) METHODS AND SYSTEMS FOR POWER MANAGEMENT OF A VEHICLE

(71) Applicant: Nott Company, Arden Hills, MN (US)

(72) Inventors: John Kahler Bowis, Saint Louis Park, MN (US); Dusten Carl O'Konek, Henderson, MN (US)

(73) Assignee: Nott Corporation, Arden Hills, MN (US)

( * ) Notice: Subject to any disclaimer, the term of this patent is extended or adjusted under 35 U.S.C. 154(b) by 1003 days.

(21) Appl. No.: 17/668,366

(22) Filed: Feb. 9, 2022

(65) Prior Publication Data

US 2023/0249581 A1 Aug. 10, 2023

(51) Int. Cl.
*B60L 58/13* (2019.01)
*B60L 1/00* (2006.01)
*B60L 1/12* (2006.01)
*B60Q 9/00* (2006.01)
*H02J 7/82* (2026.01)

(52) U.S. Cl.
CPC ................. *B60L 58/13* (2019.02); *B60L 1/00* (2013.01); *B60Q 9/00* (2013.01); *H02J 7/82* (2026.01); *B60L 2250/00* (2013.01)

(58) Field of Classification Search
CPC ........ B60L 58/13; B60L 1/00; B60L 2250/00; B60L 1/12; B60L 2250/10; H02J 7/0048; B60Q 9/00
USPC ...................................................... 701/22, 25
See application file for complete search history.

(56) References Cited

U.S. PATENT DOCUMENTS

| | | | | | |
|---|---|---|---|---|---|
| 3,852,732 | A * | 12/1974 | Yorksie | G01R 19/16542 320/DIG. 15 |
| 6,745,117 | B1 * | 6/2004 | Thacher | B60W 10/30 903/906 |
| 8,269,641 | B2 * | 9/2012 | Bauman | H02J 7/14 320/132 |
| 10,086,704 | B2 * | 10/2018 | Khafagy | B60W 30/18018 |
| 10,328,805 | B1 * | 6/2019 | Wyrobek | B60L 53/00 |
| 11,130,410 | B2 * | 9/2021 | Goerick | B60L 15/2045 |
| 2003/0085689 | A1 * | 5/2003 | Berneis | H02J 1/14 320/135 |
| 2008/0291001 | A1 * | 11/2008 | Caspe-Detzer | F02D 41/042 340/438 |
| 2010/0030431 | A1 * | 2/2010 | Potter | H02J 7/1476 701/112 |
| 2010/0094496 | A1 * | 4/2010 | Hershkovitz | B60L 50/66 701/22 |

(Continued)

OTHER PUBLICATIONS

Parker et al., Electric Refuse Vehicle Power Management, Provisional U.S. Pub 2022/0410688, filed Jun. 29, 2021, pp. 1-20 (pdf).*

*Primary Examiner* — Manglesh M Patel
(74) *Attorney, Agent, or Firm* — Ballard Spahr LLP

(57) ABSTRACT

The battery levels and location of the vehicle may be monitored to manage the features or modes available to use on the vehicle. A distance from the vehicle to a location may be determined. Based on the distance, a threshold power level for the vehicle to move to the location may be determined. A battery level for the vehicle may be determined. The battery level may be determine to not satisfy the threshold power level for the vehicle to move to the location. Based on the battery level not satisfying the threshold power level, an operational command may be executed at the vehicle.

19 Claims, 7 Drawing Sheets

(56) References Cited

U.S. PATENT DOCUMENTS

| | | | | |
|---|---|---|---|---|
| 2010/0204863 | A1* | 8/2010 | Sakamoto | G06Q 50/06 180/65.285 |
| 2010/0292047 | A1* | 11/2010 | Saito | B60K 6/365 477/3 |
| 2011/0224900 | A1* | 9/2011 | Hiruta | G01C 21/3469 701/533 |
| 2011/0276209 | A1* | 11/2011 | Suganuma | B60W 10/26 180/65.265 |
| 2012/0112754 | A1* | 5/2012 | Kawai | B60L 58/16 324/427 |
| 2013/0197766 | A1* | 8/2013 | Kurikuma | E02F 9/2246 701/50 |
| 2014/0060045 | A1* | 3/2014 | Loveland | B60W 20/13 60/624 |
| 2014/0288742 | A1* | 9/2014 | Hokoi | B60W 20/14 180/65.265 |
| 2014/0358367 | A1* | 12/2014 | Copeland | B60R 16/03 701/36 |
| 2014/0379183 | A1* | 12/2014 | Long | B60W 50/14 701/22 |
| 2016/0137085 | A1* | 5/2016 | Anglin | G05F 5/00 700/296 |
| 2016/0229411 | A1* | 8/2016 | Murata | B60L 58/12 |
| 2016/0280211 | A1* | 9/2016 | Lian | F02N 11/00 |
| 2016/0325637 | A1* | 11/2016 | Payne | B60L 50/16 |
| 2016/0334234 | A1* | 11/2016 | Wild | B60L 53/66 |
| 2017/0001624 | A1* | 1/2017 | Wang | B60W 20/13 |
| 2017/0009427 | A1* | 1/2017 | Ishida | B60L 58/25 |
| 2017/0028978 | A1* | 2/2017 | Dunlap | B60W 10/26 |
| 2017/0297448 | A1* | 10/2017 | Sufrin-Disler | B60L 58/20 |
| 2018/0347535 | A1* | 12/2018 | Chen | F02N 11/0825 |
| 2020/0047629 | A1* | 2/2020 | Cho | B60L 15/2045 |
| 2020/0171970 | A1* | 6/2020 | Lee | B60L 7/10 |
| 2020/0266496 | A1* | 8/2020 | Podolefsky | H01M 50/204 |
| 2020/0331452 | A1* | 10/2020 | Ferreira De Araujo | B60W 30/18027 |
| 2022/0041186 | A1* | 2/2022 | Michel | H02J 7/00306 |
| 2022/0049467 | A1* | 2/2022 | Hirose | B60K 17/10 |
| 2022/0057222 | A1* | 2/2022 | Wang | B60L 58/12 |
| 2022/0290410 | A1* | 9/2022 | Ogawa | F15B 20/007 |
| 2022/0410688 | A1* | 12/2022 | Parker | B65F 3/02 |
| 2023/0094310 | A1* | 3/2023 | Zhao | B60L 58/14 701/22 |
| 2023/0168696 | A1* | 6/2023 | Lane | G05D 1/12 701/25 |
| 2024/0051405 | A1* | 2/2024 | Morishita | B60L 58/15 |
| 2024/0174108 | A1* | 5/2024 | Jing | H01M 10/425 |
| 2024/0313571 | A1* | 9/2024 | Bidgood | H02J 7/342 |

* cited by examiner

METHODS AND SYSTEMS FOR POWER MANAGEMENT OF A VEHICLE

BACKGROUND

Alternative fuel vehicles are becoming increasingly available. For example, alternatives to combustion-type engines for trucks, automobiles, and other forms of vehicles are becoming more commonplace. Electric and hybrid electric/combustion engines are just two forms of alternative fuel power plants available for powering the vehicle. As these alternatives are scaled for larger vehicles, such as service vehicles, fleet vehicles, construction vehicles, farm implements, the power needs of the vehicle will be increased.

This will certainly be the case for vehicles that operate in both driving and non-driving modes (e.g., bucket lift trucks, street sweepers, street vacuums, vehicles with cranes or lifts, concrete mixing trucks, garbage trucks, and the like). The non-driving functions (e.g., lifting the bucket, sweeping the street, vacuuming the street, operating the crane or lift, mixing, compacting, and the like) that may be conventionally powered by operating the combustion engine, will now need to be powered by the battery system of the vehicle. This can result in the vehicle running out of power while operating in the non-driving mode, or failing to be able to return to a base location in the driving mode because too much power from the battery system was utilized while operating in a non-driving mode or while simultaneously operating in the driving and non-driving mode.

SUMMARY

It is to be understood that both the following general description and the following detailed description are exemplary and explanatory only and are not restrictive. Methods and systems for managing power and operations of a vehicle are described.

In an aspect, a distance from a vehicle to a location may be determined. Based on that distance, a threshold power level for the vehicle to move to the location may be determined. The current battery level for the vehicle may be determined to not satisfy the threshold battery level. Based on the current battery level for the vehicle not satisfying the threshold battery level, an operational command at the vehicle may be executed.

In another aspect, a vehicle may be determined to be operating in a non-driving mode. A threshold power level for the vehicle to drive to a location may be determined. The current amount of battery power for the vehicle may be determined to not satisfy the threshold power level. Based on the current amount of battery power not satisfying the threshold power level, an operational command may be executed for the vehicle. The operational command may be associated with the non-driving mode of the vehicle.

In another aspect, a current location for a vehicle, the battery level for the vehicle, and the power consumption rate for the vehicle may be received. A distance from the vehicle to move to a base location may be determined based on the current location of the vehicle. A threshold power level for the vehicle to move to the based location may be determined based on the distance and the power consumption rate for the vehicle. The battery level may be determined to not satisfy the threshold power level. Based on the battery level not satisfying the threshold power level, an operational command may be sent to the vehicle. The operational command may be associated with a non-driving mode capability of the vehicle.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, illustrate example embodiments and together with the description, serve to explain the principles of the apparatuses, methods and systems described herein.

DETAILED DESCRIPTION

Figure 1:
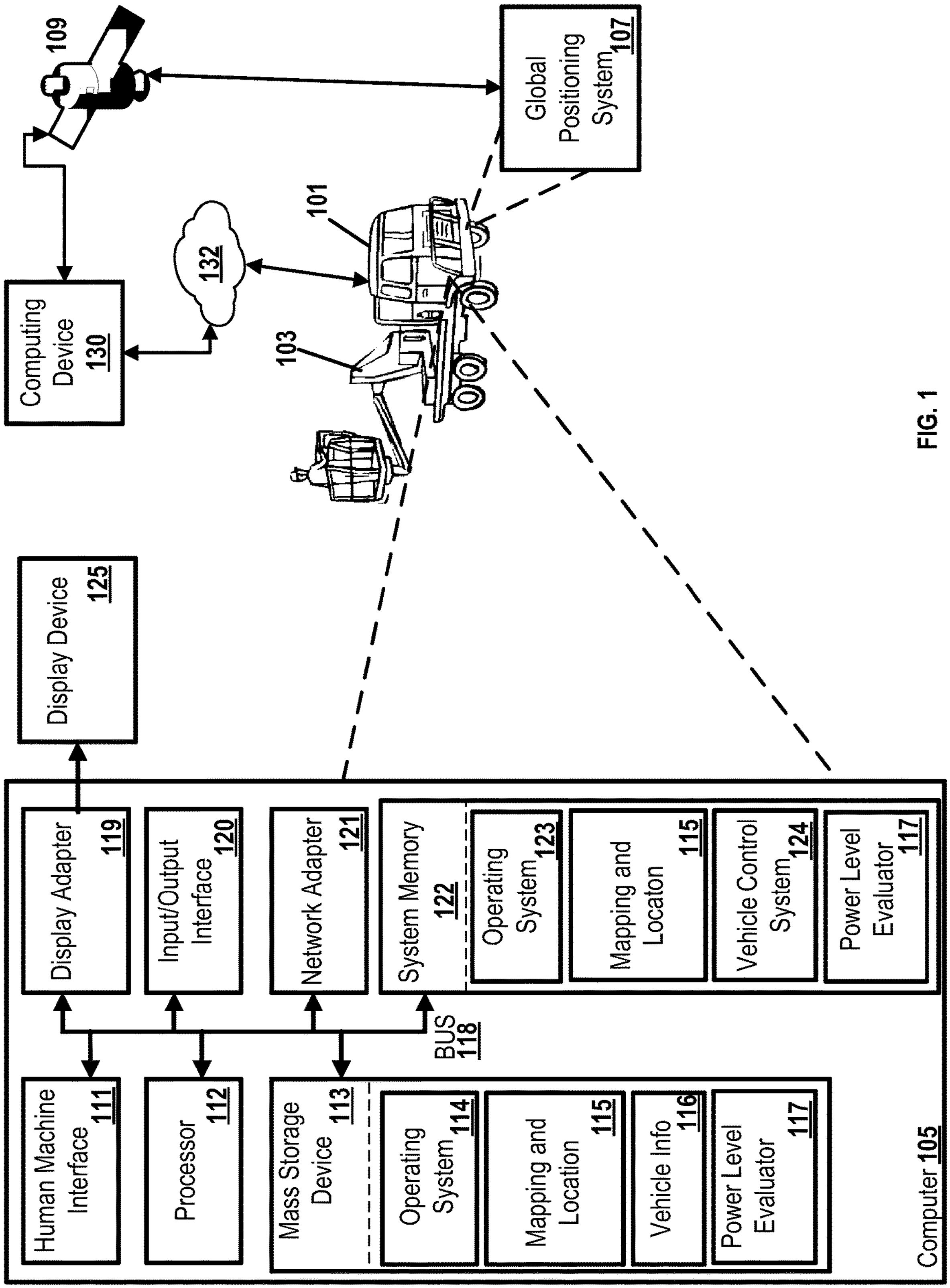
FIG. 1 is a block diagram of an example system for power management of a vehicle.

The methods, systems, and apparatuses describe herein are not limited to specific methods, specific components, or to particular implementations. It is also to be understood that the terminology used herein is for the purpose of describing example embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, magnetic storage devices, memresistors, Non-Volatile Random Access Memory (NVRAM), flash memory, or any combination thereof.

Embodiments of the methods, systems, and apparatuses are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

Methods, systems, and apparatuses are described herein for managing the power and operation of a vehicle (e.g., an electric vehicle or hybrid gasoline and electric powered vehicle). In one example aspect, a method may be implemented to manage the power usage of an electric vehicle. In certain example aspects, managing the power usage of the electric vehicle may be implemented based on operational systems residing solely within the vehicle in communication with a satellite via a Global Positioning System (GPS) device. In certain example aspects, managing the power usage of the electric vehicle may be implemented based on wireless communication between a remote computer (e.g., a cloud-based computing system) and the vehicle.

For example, a current location of a vehicle is used to determine at what threshold power level the vehicle must possess in order for the vehicle to successfully travel to a base location. Based on a current power level of the vehicle, the vehicle may execute an operational command, wherein the operational command may either be a warning signal or a shutdown alert.

FIG. 1 shows an example system 100 for power management of a vehicle. Although only certain devices and/or components are shown, the system 100 may comprise a variety of other devices and/or components that support a wide variety of functions, such as network and/or communication functions. Those skilled in the art will appreciate that the present systems and methods may be used in various types of networks and systems that employ both digital and analog equipment.

The system 100 may include a vehicle 101. The vehicle 101 may be any type of self-propelled vehicle, such as, but not limited to, an automobile, light or heavy duty truck, specialty truck, construction equipment, farming equipment, locomotive, all-terrain vehicle, cleaning vehicle, and the like. Examples of the vehicle 101 may include, but are not limited to, a bucket lift truck, a garbage truck, a crane transport, a crop harvester, a street vacuum, a street sweeper, a moving truck, or a concrete mixing truck. The vehicle 101 may include and be propelled or driven by one or more electric motors or a hybrid electric motors. The vehicle 101 may include a battery system electrically coupled to the one or more electric motors. The battery system may be a rechargeable battery system and may include lithium ion batteries, nickel-metal hydride batteries, lead-acid batteries, ultracapacitors, or any other form of rechargeable battery now known or hereinafter developed.

The vehicle 101 may include a non-driving mode feature, such as a working device 103. The working device 103 may be any device for conducting secondary work using the vehicle. Examples of the working device 103 may include, but are not limited to, a bucket lift, a compactor (e.g., a garbage compactor on a garbage truck), a crane, a crop harvester, a vacuum system, a street sweeping system, a lift, an elevator, or a mixer (e.g., a concrete mixer). The working device 103 may be coupled to or positioned along any portion of the vehicle 101. The working device 103 may be powered by and electrically coupled to the rechargeable battery system for the vehicle 101.

The vehicle 101 may also include a global positioning system (GPS) device 107. The GPS device 107 may be configured to wirelessly communicate with one or more GPS satellites 109. The GPS device 107 may provide an indication of the current location of the vehicle 101. The GPS device 107 may also include mapping software and may be configured to provide travel routes and distances for the vehicle from its current location to another location.

The vehicle 101 may also include a computer 105. The computer 105 may support the operation of the vehicle 101 in a driving mode and/or in a non-driving mode. The computer 105 may be communicably coupled to any electrical and/or electronic components of the vehicle 101, including the working device 103. While the example of FIG. 1 shows the computer 105 as a part of the vehicle 101, in other examples, the computer 105 may be an add-on feature for the vehicle, or may be located remote from the vehicle 101. In examples, where the computer 105 is located remote from the vehicle 101, the computer 105 may be configured to communicate wirelessly with the vehicle 101 using known wireless communication techniques.

The computer 105 may comprise one or more processors or processing units 112, a system memory 122, and a system bus 118 that couples various system components of the computer 105, including the processor 112, to the system memory 122. In the case of multiple processing units 112, the system may utilize parallel computing.

The system bus 118 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB) and the like.

The bus 118 may also be implemented over a wired or wireless network connection to each of the subsystems, including the processor 112, a mass storage device 113, an operating system 114, mapping and location software 115, vehicle information data 116, power level evaluator 117, a network adapter 121, an Input/Output (I/O) interface 120, a vehicle control system 124, a display adapter 119, a display device 125, and a human machine interface 111. It is understood that the bus 118 and each of the aforementioned subsystems may be contained within one or more remote computing devices, for example a computing device 130, at physically separate locations, connected through buses of this form, in effect implementing a fully distributed system.

The computer 105 may operate on and/or comprise a variety of computer-readable media (e.g., non-transitory computer-readable media). Computer-readable media may be any available media that is accessible by the computer 105 and comprises both volatile and non-volatile media and removable and non-removable media. The system memory 122 comprises computer-readable media in the form of volatile memory, such as random access memory (RAM), and/or non-volatile memory, such as read only memory (ROM). The system memory 122 typically contains data and/or program modules, such as an operating system 114, mapping and location software 115, a vehicle control system 124, and a power level evaluator 117, that are accessible to and/or are operated on by the one or more processors 112.

The mapping and location software 115 may be configured to receive location data for the vehicle (e.g., from the GPS device 107 and/or the vehicle information 116) and determine distances and/or routes for the vehicle to return to a location (e.g., a base location) from the vehicle's current location.

The power level evaluator 117 may be configured to receive vehicle information (e.g., from the vehicle information 116) and may determine one or more of a distance for the vehicle 101 to travel to the base location or another recharging point for the vehicle 101, a battery consumption rate for the vehicle, a threshold power level, a warning threshold power level, and whether the thresholds are satisfied. The power level evaluator 117 may also communicate with the vehicle control system 124 to send operational commands affecting the vehicle. For example, the power level evaluator 117 may send signals to the vehicle control system to initiate warning signals at the vehicle 101, to initiate countdown timers at the vehicle 101 and to disable one or more features or modes of the vehicle 101 (e.g., non-driving features or modes of the vehicle). The vehicle control system 124 may be configured to manage and monitor the features, systems, and subsystems of the vehicle 101. The vehicle control system may be configured to enable and disable one or more features or modes of the vehicle, such as non-driving modes or features.

The computer 105 may also comprise other removable/non-removable, volatile/non-volatile computer storage media. By way of example, the mass storage device 113 may provide non-volatile storage of computer code, computer readable instructions, data structures, program modules, and other data for the computer 105. For example, the mass storage device 113 may be a hard disk, a removable magnetic disk, a removable optical disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 113, including by way of example, the operating system 114, mapping and location software 115, the power level evaluator 117, and vehicle information data 116. Vehicle information data 116 may include a vehicle identifier (e.g., a vehicle identification number, license tag, or other unique identifier), the base location for the vehicle 101, the maximum battery level for the battery system of the vehicle 101, the current battery level for the vehicle 101, the warning threshold power level for the vehicle, the threshold power level for the vehicle 101, operator information, a power consumption rate for the vehicle, the distance traveled since the last time the battery system was recharged, and other vehicle related information.

An operator of the vehicle, or another user may enter commands and information into the computer 105 via an input device (not shown). Examples of such input devices comprise, but are not limited to, a keyboard, pointing device (e.g., a "mouse"), a microphone, a joystick, a scanner, tactile input devices, such as gloves, and other body coverings, and the like. These and other input devices may be connected to the one or more processors 112 via a human machine interface 111 that is coupled to the system bus 118, but may be connected by other interface and bus structures, such as a parallel port, game port, an IEEE 1394 Port (also known as a Firewire port), a serial port, or a universal serial bus (USB).

A display device 125 may also be connected to the system bus 118 via an interface, such as the display adapter 119. It is contemplated that the computer 105 may have more than one display adapter 119 and the computer 105 may have more than one display device 125. For example, a display device may be a monitor, an LCD (Liquid Crystal Display), light emitting diode (LED) display, smart glass, or a projector. In addition to the display device 125, other output peripheral devices may comprise components, such as speakers (not shown) and a printer (not shown) which may be connected to the computer 105 via the Input/Output Interface 120. Any step and/or result of the methods may be output in any form to an output device. Such output may be any form of visual representation, including, but not limited to, textual, graphical, animation, audio, tactile, and the like. The display device 125 and the computer 105 may be part of one device, or separate devices.

The computer 105 may operate in a networked environment using logical connections to one or more of the vehicle 101, the global positioning system 107, the satellite 109, and a computing device 130. The computing device 130 may be a server (e.g., a cloud server), a personal computer, a client device, a computing station, a laptop computer, a table device, a portable computer, a workstation, a network computer, and so on. In certain examples, the mapping and location software 115, the vehicle information 116, and the power level evaluator 117, may reside on or be accessible to the computing device 130 and the capabilities of the mapping and location software 115, the vehicle information 116, and the power level evaluator 117 may be completed by the computing device 130 rather than or in addition to the computer 105. The computing device 130 may be located remote from the vehicle 101.

Logical connections between the computer 105 and the computing device 130 may be made via a network 132, such as a local area network (LAN) and/or a general wide area network (WAN). Such network connections may be through a network adapter 121. The network adapter 121 may be implemented in both wired and wireless environments. Such networking environments are conventional and commonplace in dwellings, offices, enterprise-wide computer networks, intranets, and the Internet.

For purposes of illustration, application programs and other executable program components, such as the operating system 114 are illustrated herein as discrete blocks, although it is recognized that such programs and components reside at various times in different storage components of the computer 105, and are executed by the data processor(s) of the computer 105. An implementation of the mapping and location software 115, the vehicle information 116, and/or the power level evaluator 117 may be stored on or transmitted across some form of computer-readable media. Any of the disclosed methods may be performed by computer-readable instructions embodied on computer-readable media.

Figure 2:
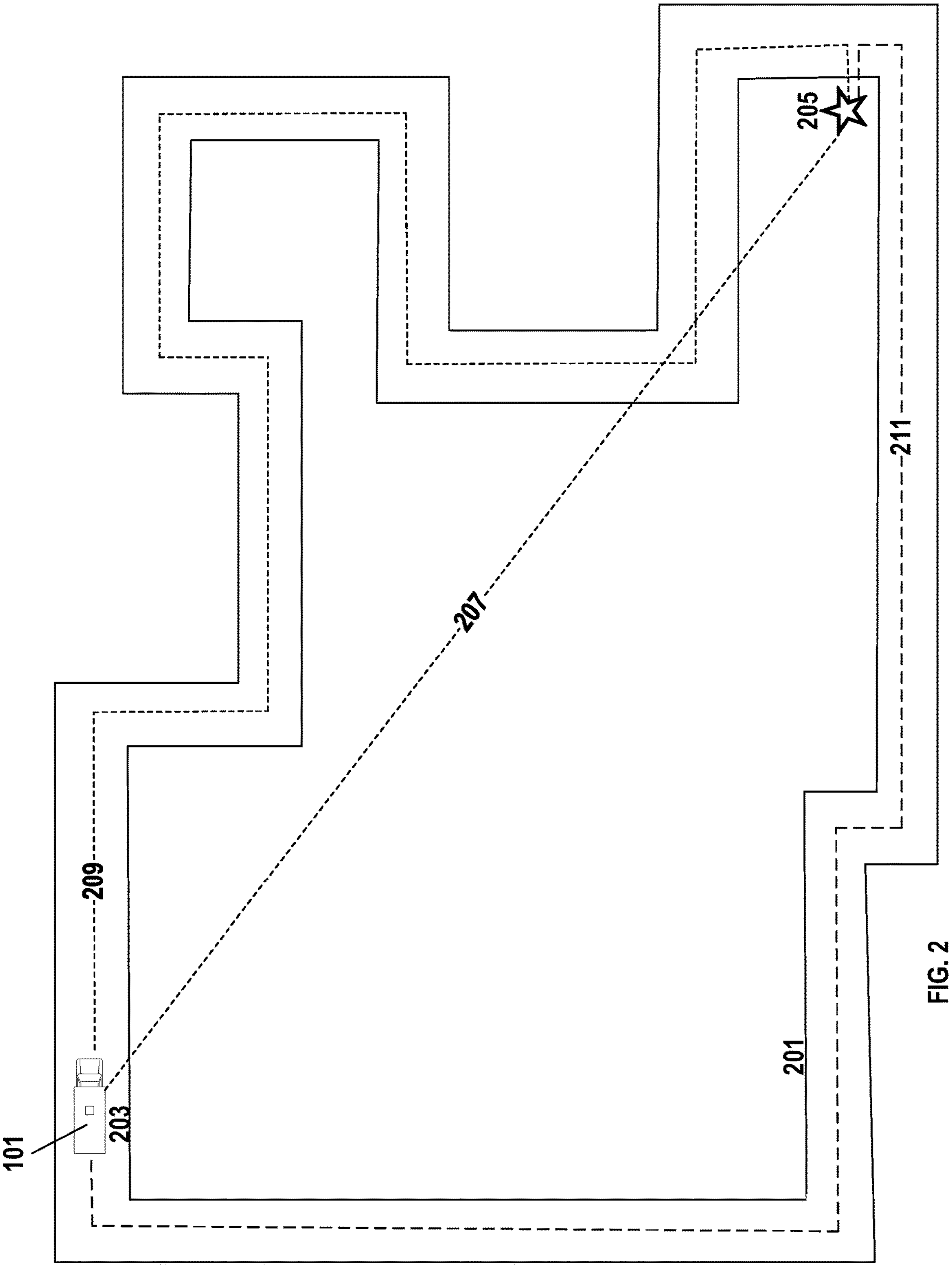
FIG. 2 illustrates a graphical representation of an example environment within which power management of the vehicle occurs.

FIG. 2 is a graphical representation of an exemplary environment illustrative of a route the vehicle 101 may take in relation to a location 205. For example, the location 205 may be a base location or home location which operates as a main charging station for the vehicle 101. In an aspect, a current location 203 for the vehicle 101 may be constantly updated through means of the vehicle's GPS device 107 communicating with the satellite 109. For example, the vehicle may depart from the location 205 and may proceed on a driven route 211 along a path 201 until the vehicle 101 reaches the current location 203. The path 201 may be a road, train tracks, sidewalks, the path the vehicle 101 takes, or any combination thereof. While at the current location 203, an initial distance to the location 205 may be determined (e.g., by the computer 105 or computing device 130). The initial distance may be a straight-line distance 207 or a distance based on a driving route 209. The driving route 209 may be one of many optional driving routes and may be determined based on any number of factors, such as any one or more of the shortest route, the fastest route, the route with the fewest stop lights or stop signs, the route with the fewest turns, the route that avoids certain areas (e.g., residential areas), etc. As is evident in FIG. 2, the driving route 209 is illustrated as being a greater distance than a straight-line distance 207 relative of the distance between the vehicle 101 and the location 205.

Figure 3:
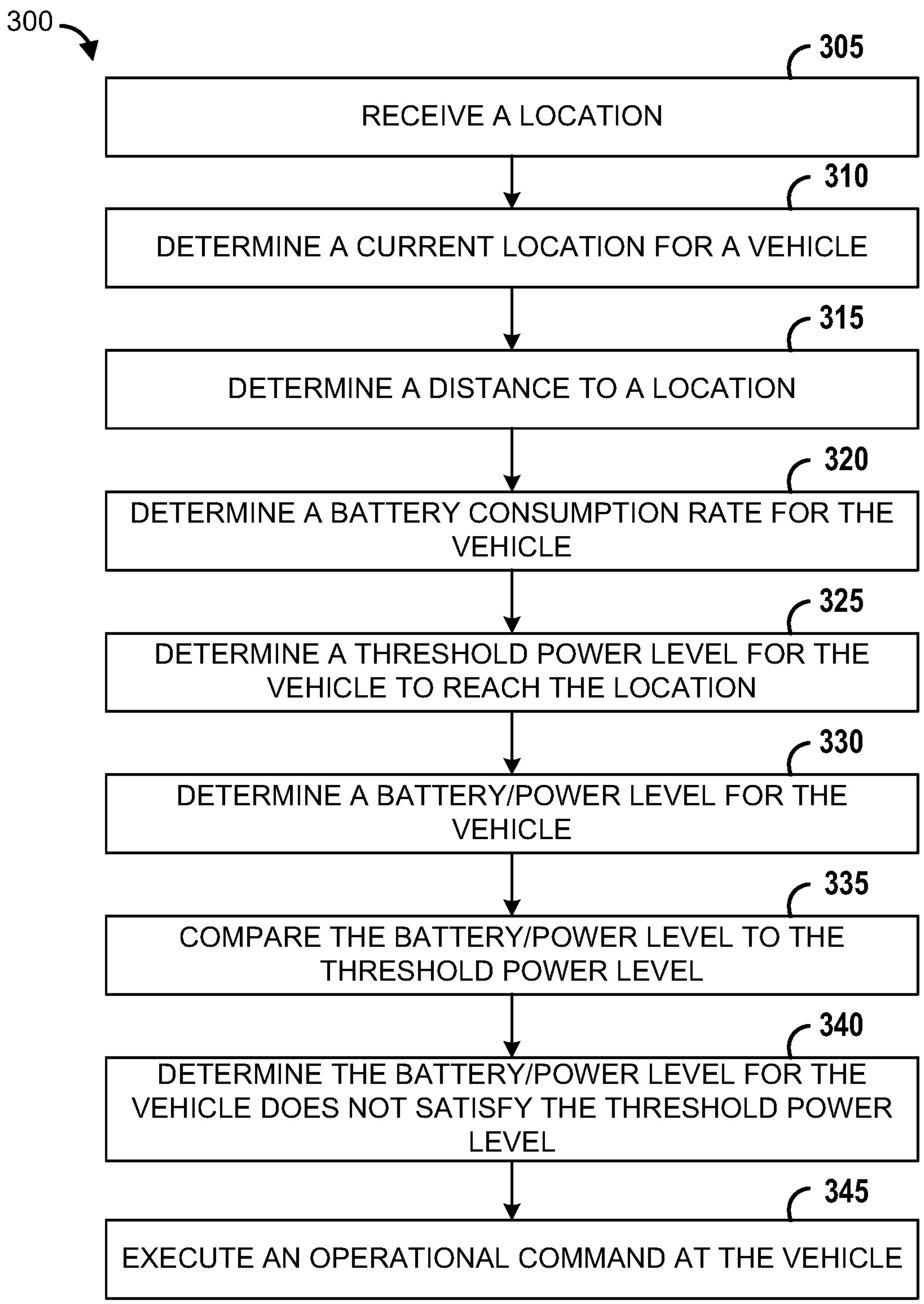
FIG. 3 is a flowchart of an example method for power management of the vehicle.

FIG. 3 is a flowchart illustrating an example method 300 for power management of the vehicle 101. At 305, a location 205 may be received. For example, the location 205 may be received by the computer 105 or the computing device 130. For example, the location 205 may be preprogrammed within the mass storage device 113 of the computer 105, within a database (not shown) associated with the computing device 130 or input by an operator of the vehicle 101. The location 205 may be a set of coordinates (e.g., latitude and longitude), a street address, or a position on a map (e.g., an electronic map). For example, the location 205 may be indicative of or be a base location for the vehicle 101. The base location may be a home base for the vehicle 101 and may comprise a charging station for an electrically-powered motor of the vehicle 101. In other examples, the location 205 may correspond to an alternative location which the vehicle 101 may identify as a charging station that may be used by the vehicle 101. For example, the received location 205 may be stored remotely from the computer 105 and accessed via the network 132.

At 310, a current location 203 for the vehicle 101 may be determined. For example, the current location 203 may be determined by the computer 105 or the computing device 130. For example, the computer 105 may determine the current location from the GPS device 107. For example, the GPS device 107 may communicate with the satellite 109 to determine the current location 203 of the vehicle 101 and provide the current location to the computer 105 or the computing device 130 via the network 132. The current location 203 may be stored locally within the computer 105 (e.g., the mass storage device 113) disposed within the vehicle 101 or may be stored remotely. For example, the location 205 may be stored within the computing device 130.

At 315, a distance from the current location 203 of the vehicle 101 to the location 205 may be determined. For example, the distance may be determined by the computer 105 or the computing device 130. For example, the distance between the current location 203 and the location 205 may be determined based on the straight-line distance 207 between the current location 203 and the location 205 or based on a determined route (e.g., a street route or driving distance using the street route) 209 between the current location 203 and the location 205.

For example, determining the distance between the current location 203 and the location 205 based on the straight-line distance may include determining the straight-line distance 207 and adjusting the determined straight-line distance 207 by a distance safety factor. The distance safety factor may be one or more of a predetermined distance (e.g., a mile, 5 miles, etc.) that is added to the determined straight-line distance 207, a percentage (e.g., 150%, 200%, etc.) that is multiplied by the straight-line distance 207, or a factor value (e.g., 1.5, 1.75) that is multiplied by the straight line distance 207, to determine the distance. The distance safety factor may be fixed or variable. For example, the distance safety factor may be based on the amount of the straight-line distance. For example, as the straight-line distance increases, the distance safety factor may change (e.g., increase).

For example, determining the distance between the current location 203 and the location 205 based on the determined route 209 may include determining a driving route 209 from the current location 203 to the location 205. The driving route may be determined by the computer 105 or the computing device 130. The driving route 209 may be one of many optional driving routes and may be determined based on any number of factors, such as any one or more of the shortest route, the fastest route, the route with the fewest stop lights or stop signs, the route with the fewest turns, the route that avoids certain areas (e.g., residential areas), etc. For example, the distance may be the determined driving route distance 209. In other examples, the determined driving route distance 209 may be adjusted by a distance safety factor. For example, the distance safety factor for the determined driving route 209 may be the same or different from the distance safety factor for a determined straight-line distance 207.

The distance safety factor may be one or more of a predetermined distance (e.g., a mile, 5 miles, etc.) that is added to the determined driving route distance 209, a percentage (e.g., 150%, 200%, etc.) that is multiplied by the determined driving route distance 209, or a factor value (e.g., 1.5, 1.75) that is multiplied by the determined driving route distance 209, to determine the distance. The distance safety factor may be fixed or variable. For example, the distance safety factor may be based on the amount of the determined driving route distance 209. For example, as the driving route distance 209 increases, the distance safety factor may change (e.g., increase). For example, the GPS device 107 may be utilized to determine the straight-line distance 207 and/or the driving route distance. For example, the determined distance to the location 205 may be stored in the computer 105 (e.g., mapping and location module 115) or the computing device 130.

At 320, a battery consumption rate for the vehicle 101 may be determined. For example, the battery consumption rate may be determined by the computer 105 or the computing device 130. For example, the battery consumption rate may comprise the amount of battery power used for a driven distance 211 for the vehicle 101. For example, the battery consumption rate may be expressed in the amount of kilowatt hours of battery power used per mile the vehicle 101 has been driven.

For example, the computer 105 or the computing device 130 (e.g., via the power level evaluator 117) may determine the current battery level for the vehicle 101. For example, an amount of kilowatt hours consumed by the vehicle 101 since the vehicle's last charge may be determined, by the computer 105 or the computing device 130, by taking a difference of the total kilowatt hours available in the battery system of the vehicle 101 when fully charged and the current kilowatt hours available in the battery system of the vehicle 101 (e.g., based on the current battery level). The amount of kilowatt hours consumed by the vehicle 101 may be adjusted based on the amount of kilowatt hours consumed by non-driving mode features of the vehicle 101. For example, the kilowatt hours consumed by non-driving move features of the vehicle 101 may be subtracted from the amount of kilowatt hours consumed.

The computer 105 or the computing device 130 (e.g., via the mapping and location module 115 or a trip odometer) may also determine the driven distance for the vehicle 101 since the last time the vehicle's battery was charged. For example, the driven distance may be the driving distance 211 from the location 205 to the current location 203 of the vehicle 101. For example, the computer 105 or the computing device 130 may calculate the battery consumption rate by dividing the amount of kilowatt hours consumed by the vehicle 101 since the vehicle's last charge by the driven distance since the vehicle's last charge.

At 325, a threshold power level for the vehicle 101 to reach the location 205 from the current location 203 may be determined. For example, the threshold power level may be determined by the computer 105 (e.g., the power level evaluator 117) or the computing device 130. For example, the threshold power level may include a minimum amount of power value. For example, the minimum amount of power value may include or be the product of multiplying the battery consumption rate by the determined distance to the location 205. For example, the determined distance may be determined based on either of the straight line calculation or the route calculation discussed above. For example, the threshold power level may also include a return safety factor value. For example, the return safety factor value may be a value that adjusts or modifies (e.g., increases) the minimum amount of power value to provide a reserved amount of battery power and an increased likelihood that the vehicle 101 will reach the location 205 before depleting the battery power for the vehicle 101. The return safety factor value may be one or more of a predetermined amount of kilowatt hours of battery power (e.g., 1 kwh, 5 kwh, etc.) that is added to the minimum amount of power value, a percentage (e.g., 110%, 130%, etc.) that is multiplied by the minimum amount of power value, or a factor value (e.g., 1.3, 2.5) that is multiplied by the minimum amount of power value, to determine the threshold power level for the vehicle 101 to return to the location 205 in a driving mode.

At 330, a battery level, or a power level, for the vehicle 101 may be determined. For example, the battery or power level may be determined by the computer 105 (e.g., the power level evaluator 117 from the vehicle information 116) or the computing device 130. For example, the battery or power level for the vehicle may be expressed in the amount of kilowatt hours of power remaining in the battery system for the vehicle 101. For example, the battery or power level for the vehicle 101 may be a current battery level. For example, the battery or power level for the vehicle 101 may be indicated by a battery level display in the vehicle 101.

At 335, the battery or power level may be compared to the threshold power level. For example, the computer 105 (e.g., the power level evaluator 117) or the computing device 130 may compare the battery or power level to the threshold power level. For example, the battery or power level may be compared to the threshold power level to determine if the battery or power level for the vehicle 101 has fallen to a level that is equal to or within a predetermined amount of the threshold power level.

At 340, a determination may be made that the current battery or power level for the vehicle 101 does not satisfy the threshold power level. For example, the computer 105 (e.g., the power level evaluator 117) or the computing device 130 may determine that the battery or power level does not satisfy the threshold power level. For example, the determination may be based on the comparison of the battery or power level to the threshold power level. For example, the battery or power level may not satisfy the threshold power level when the battery or power level is less than or equal to (or within a predetermined amount of) the threshold power level. In other examples, it may be determined that the battery or power level satisfies the threshold power level, in which the threshold power level is satisfied when the battery or power level is equal to (or within a predetermined amount of) or less than the threshold power level. For example, the battery or power level for the vehicle 101 may be the current battery level.

At 345, an operational command may be executed at the vehicle 101. For example, the computer 105 may execute the operational command. In another example, the computing device 130 may cause an operational command to be executed at the vehicle by sending a command request to the vehicle 101 via the network 132. The vehicle 101 (e.g., the computer 105) may receive the command request and, in response, execute the operational command at the vehicle 101.

For example, the operational command may be executed based on the determination that the battery or power level for the vehicle 101 does not satisfy the threshold power level. For example, the operational command may be one or more of an alarm signal (e.g., one or more of a warning signal light, sound, vibration, or any combination thereof), a timer (e.g., a countdown timer), or disabling of a feature of the vehicle 101 (e.g., disabling a non-driving feature or a non-driving mode of the vehicle). The non-driving feature or non-driving mode of the vehicle 101 may comprise a bucket lift, a garbage compactor, a crane, a vacuum, a street sweeper, a lift, an elevator, a mixer, or a crop harvester. For example, executing the operational command may include activating the alarm signal. For example, executing the operational command may include activating the countdown timer. The countdown timer may have a predetermined or variable amount of time on it and may count down from that time until an operator of the vehicle 101 turns off the time or the timer runs out. For example, when the timer runs out, another operational command may be executed. For example, the other operational command may be to activate an alarm signal or to disable one or more non-driving features of the vehicle 101. For example, disabling one or more of the non-driving features or non-driving modes of the vehicle 101 may comprise disabling the non-driving feature or mode via the vehicle control system 124 or sending a signal to the vehicle control system 124 to the non-driving feature or mode.

The operational command may alert an operator (not shown) of the vehicle 101 that that the current battery level does not satisfy the threshold power level. The operational command may act as a warning, informing the operator that the battery level of the vehicle 101 is currently low and that the electrically-powered motor of the vehicle 101 may require a charge. The operational command may alert the operator that certain features or modes of the vehicle 101 (e.g., non-driving features or modes) are shutting down due to an insufficient battery level remaining in the electrically-powered motor based on the current battery level not satisfying the threshold power level.

In certain examples, the operator of the vehicle 101 may override or deactivate the action initiated by the operational command. For example, the alarm signal may be deactivated or paused by an operator input at the vehicle 101. For example, the timer may be turned off by an operator input at the vehicle 101. For example, the non-driving feature or mode may be reactivated by an operator input at the vehicle 101. In certain examples, when the operator overrides or deactivates the action initiated by the operational command (e.g., the alarm signal, timer, or deactivation of a non-driving feature or mode of the vehicle 101), the computer 105 may store a record of the operator input. For example, other information related to the operator input may also be recorded by the computer 105 or sent to the computing device 130 for recording. The other information may comprise an identifier of the operator, an identifier of the vehicle, a time/date reference, the action that was overridden, the battery or power level for the vehicle 101, the distance to the location 205, and/or the threshold power level.

Figure 4:
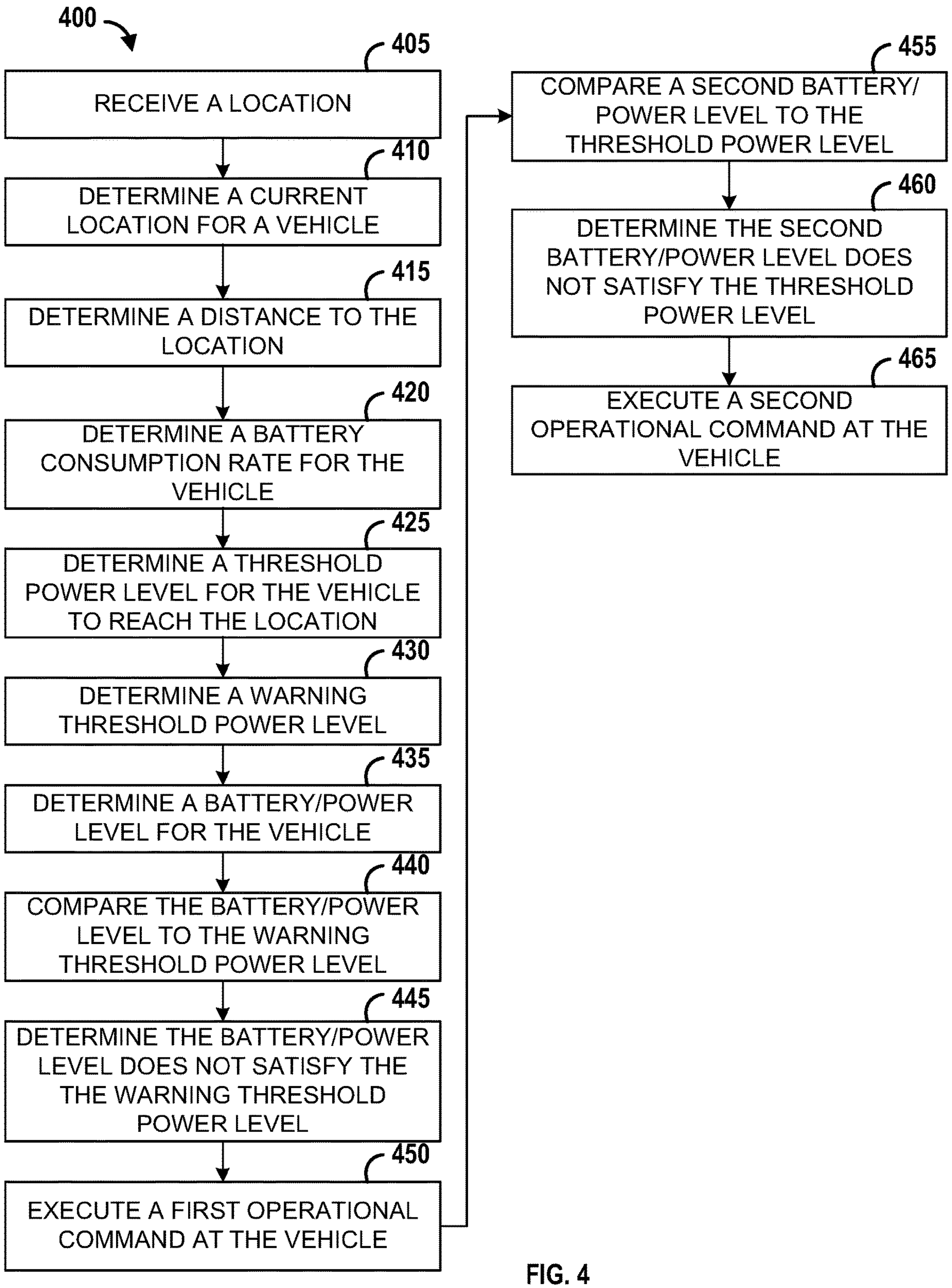
FIG. 4 is a flowchart of another example method for power management of the vehicle.

FIG. 4 is a flowchart illustrating another example method 400 for power management of the vehicle 101. At 405, a location 205 may be received. For example, the location 205 may be received by the computer 105 or the computing device 130. For example, the location 205 may be preprogrammed within the mass storage device 113 (e.g., the vehicle information 116) of the computer 105, within a database (not shown) associated with the computing device 130, or input by an operator of the vehicle 101. The location 205 may be a set of coordinates (e.g., latitude and longitude), a street address, or a position on a map (e.g., an electronic map). For example, the location 205 may be indicative of or be a base location for the vehicle 101. The base location may be a home base for the vehicle 101 and may comprise a charging station for an electrically-powered motor of the vehicle 101. In other examples, the location 205 may correspond to an alternative location which the vehicle 101 may identify as a charging station that may be used by the vehicle 101. For example, the received location 205 may be stored remotely from the computer 105 and accessed via the network 132.

At 410, a current location 203 for the vehicle 101 may be determined. For example, the current location 203 may be determined by the computer 105 or the computing device 130. For example, the computer 105 may determine the current location from the GPS device 107. For example, the GPS device 107 may communicate with the satellite 109 to determine the current location 203 of the vehicle 101 and provide the current location to the computer 105 or the computing device 130 via the network 132. The current location 203 may be stored locally within the computer 105 (e.g., in vehicle information 116 of the mass storage device 113) disposed within the vehicle 101 or may be stored remotely. For example, the location 205 may be stored within the computing device 130.

At 415, a distance from the current location 203 of the vehicle 101 to the location 205 may be determined. For example, the distance may be determined by the computer 105 or the computing device 130. For example, the distance between the current location 203 and the location 205 may be determined based on the straight-line distance 207 between the current location 203 and the location 205 or based on a determined route (e.g., a street route or driving distance using the street route) 209 between the current location 203 and the location 205.

For example, determining the distance between the current location 203 and the location 205 based on the straight-line distance may include determining the straight-line distance 207 and adjusting the determined straight-line distance 207 by a distance safety factor. The distance safety factor may be one or more of a predetermined distance (e.g., a mile, 5 miles, etc.) that is added to the determined straight-line distance 207, a percentage (e.g., 150%, 200%, etc.) that is multiplied by the straight-line distance 207, or a factor value (e.g., 1.5, 1.75) that is multiplied by the straight line distance 207, to determine the distance. The distance safety factor may be fixed or variable. For example, the distance safety factor may be based on the amount of the straight-line distance. For example, as the straight-line distance increases, the distance safety factor may change (e.g., increase).

For example, determining the distance between the current location 203 and the location 205 based on the determined route 209 may include determining a driving route 209 from the current location 203 to the location 205. The driving route may be determined by the computer 105 or the computing device 130. The driving route 209 may be one of many optional driving routes and may be determined based on any number of factors, such as any one or more of the shortest route, the fastest route, the route with the fewest stop lights or stop signs, the route with the fewest turns, the route that avoids certain areas (e.g., residential areas), etc. For example, the distance may be the determined driving route distance 209. In other examples, the determined driving route distance 209 may be adjusted by a distance safety factor. For example, the distance safety factor for the determined driving route 209 may be the same or different from the distance safety factor for a determined straight-line distance 207.

The distance safety factor may be one or more of a predetermined distance (e.g., a mile, 5 miles, etc.) that is added to the determined driving route distance 209, a percentage (e.g., 150%, 200%, etc.) that is multiplied by the determined driving route distance 209, or a factor value (e.g., 1.5, 1.75) that is multiplied by the determined driving route distance 209, to determine the distance. The distance safety factor may be fixed or variable. For example, the distance safety factor may be based on the amount of the determined driving route distance 209. For example, as the driving route distance 209 increases, the distance safety factor may change (e.g., increase). For example, the GPS device 107 may be utilized to determine the straight-line distance 207 and/or the driving route distance. For example, the determined distance to the location 205 may be stored in the computer 105 (e.g., mapping and location module 115) or the computing device 130.

At 420, a battery consumption rate for the vehicle 101 may be determined. For example, the battery consumption rate may be determined by the computer 105 (e.g., the power level evaluator 117) or the computing device 130. For example, the battery consumption rate may comprise the amount of battery power used for a driven distance 211 for the vehicle 101. For example, the battery consumption rate may be expressed in the amount of kilowatt hours of battery power used per mile the vehicle 101 has been driven.

For example, the computer 105 or the computing device 130 (e.g., via the power level evaluator 117) may determine the current battery level for the vehicle 101. For example, an amount of kilowatt hours consumed by the vehicle 101 since the vehicle's last charge may be determined, by the computer 105 or the computing device 130, by taking a difference of the total kilowatt hours available in the battery system of the vehicle 101 when fully charged and the current kilowatt hours available in the battery system of the vehicle 101 (e.g., based on the current battery level). The amount of kilowatt hours consumed by the vehicle 101 may be adjusted based on the amount of kilowatt hours consumed by non-driving mode features of the vehicle 101. For example, the kilowatt hours consumed by non-driving move features of the vehicle 101 may be subtracted from the amount of kilowatt hours consumed.

The computer 105 or the computing device 130 (e.g., via the mapping and location module 115 or a trip odometer) may also determine the driven distance for the vehicle 101 since the last time the vehicle's battery was charged. For example, the driven distance may be the driving distance 211 from the location 205 to the current location 203 of the vehicle 101. For example, the computer 105 or the computing device 130 may calculate the battery consumption rate by dividing the amount of kilowatt hours consumed by the vehicle 101 since the vehicle's last charge by the driven distance since the vehicle's last charge.

At 425, a threshold power level for the vehicle 101 to reach the location 205 from the current location 203 may be determined. For example, the threshold power level may be determined by the computer 105 (e.g., the power level evaluator 117) or the computing device 130. For example, the threshold power level may include a minimum amount of power value. For example, the minimum amount of power value may include or be the product of multiplying the battery consumption rate by the determined distance to the location 205. For example, the determined distance may be determined based on either of the straight line calculation or the route calculation discussed above. For example, the threshold power level may also include a return safety factor value. For example, the return safety factor value may be a value that adjusts or modifies (e.g., increases) the minimum amount of power value to provide a reserved amount of battery power and an increased likelihood that the vehicle 101 will reach the location 205 before depleting the battery power for the vehicle 101. The return safety factor value may be one or more of a predetermined amount of kilowatt hours of battery power (e.g., 1 kwh, 5 kwh, etc.) that is added to the minimum amount of power value, a percentage (e.g., 110%, 130%, etc.) that is multiplied by the minimum amount of power value, or a factor value (e.g., 1.3, 2.5) that is multiplied by the minimum amount of power value, to determine the threshold power level for the vehicle 101 to return to the location 205 in a driving mode.

At 430, a warning threshold power level may be determined. For example, the warning threshold power level may be determined by the computer 105 (e.g., power level evaluator 117) or the computing device 130. For example, the warning threshold power level may be greater than the threshold power level. For example, the warning threshold power level may indicate an amount of power remaining in the battery system of the vehicle 101 at which a warning, timer, or other action should be initiated at the vehicle 101. For example, the warning threshold power level may be determined based on the minimum amount of power value. For example, the minimum amount of power value may be adjusted or modified by a warning factor value. For example, the warning factor value may be greater than the return safety factor value. For example, the warning factor value may be one or more of a predetermined amount of kilowatt hours of battery power (e.g., 1 kwh, 5 kwh, etc.) that is added to the minimum amount of power value, a percentage (e.g., 150%, 210%, etc.) that is multiplied by the minimum amount of power value, or a factor value (e.g., 1.8, 3.1) that is multiplied by the minimum amount of power value, to determine the warning threshold power level for a warning signal, timer, or other action to be executed at the vehicle 101.

At 435, a battery level, or a power level, for the vehicle 101 may be determined. For example, the battery or power level may be determined by the computer 105 (e.g., the power level evaluator 117 from the vehicle information 116) or the computing device 130. For example, the battery or power level for the vehicle may be expressed in the amount of kilowatt hours of power remaining in the battery system for the vehicle 101. For example, the battery or power level for the vehicle 101 may be a current battery level for the vehicle 101. For example, the battery or power level for the vehicle 101 may be indicated by a battery level display in and/or on the vehicle 101.

At 440, the battery or power level may be compared to the warning threshold power level. For example, the computer 105 (e.g., the power level evaluator 117) or the computing device 130 may compare the battery or power level to the warning threshold power level. For example, the battery or power level may be compared to the warning threshold power level to determine if the battery or power level for the vehicle 101 has fallen to a level that is equal to or within a predetermined amount of the warning threshold power level.

At 445, a determination may be made that the current battery or power level for the vehicle 101 does not satisfy the warning threshold power level. For example, the computer 105 (e.g., the power level evaluator 117) or the computing device 130 may determine that the battery or power level does not satisfy the warning threshold power level. For example, the determination may be based on the comparison of the battery or power level to the warning threshold power level. For example, the battery or power level may not satisfy the warning threshold power level when the battery or power level is less than or equal to (or within a predetermined amount of) the warning threshold power level. In other examples, it may be determined that the battery or power level satisfies the warning threshold power level, in which the warning threshold power level is satisfied when the battery or power level is equal to (or within a predetermined amount of) or less than the warning threshold power level.

At 450, a first operational command may be executed at the vehicle 101. For example, the computer 105 may execute the first operational command. In another example, the computing device 130 may cause the first operational command to be executed at the vehicle by sending a command request to the vehicle 101 via the network 132. The vehicle 101 (e.g., the computer 105) may receive the command request and, in response, execute the first operational command at the vehicle 101.

For example, the first operational command may be executed based on the determination that the battery or power level for the vehicle 101 does not satisfy the warning threshold power level. For example, the first operational command may be one or more of an alarm signal (e.g., one or more of a warning signal, light, sound, vibration, or any combination thereof) or a timer (e.g., a countdown timer). For example, executing the first operational command may include activating the alarm signal. For example, the alarm signal may be activated by activating the alarm signal via the vehicle control system 124 or sending a signal to the vehicle control system 124 to activate the alarm signal. For example, executing the first operational command may include activating the countdown timer. The countdown timer may have a predetermined or variable amount of time on it and may count down from that time until an operator of the vehicle 101 turns off the timer or the timer runs out. For example, when the timer runs out, another operational command may be executed.

In certain examples, the operator of the vehicle 101 may override or deactivate the action initiated by the first operational command. For example, the alarm signal may be deactivated or paused by an operator input at the vehicle 101. For example, the timer may be turned off by an operator input at the vehicle. In certain examples, when the operator overrides or deactivates the action initiated by the first operational command (e.g., the alarm signal, timer, or deactivation of a non-driving feature or mode of the vehicle 101), the computer 105 may store a record of the operator input. For example, other information related to the operator input may also be recorded by the computer 105 or sent to the computing device 130 for recording. The other information may comprise an identifier of the operator, an identifier of the vehicle, a time/date reference, the action that was overridden, the battery or power level for the vehicle 101, the distance to the location 205, the warning threshold power level, and/or the threshold power level.

At 455, a second battery or power level may be compared to the threshold power level. For example, the computer 105 (e.g., the power level evaluator 117) or the computing device 130 may compare the second battery or power level to the threshold power level. The second battery or power level for the vehicle 101 may be determined at a time subsequent to the determination of the battery or power level of 435. For example, the second battery or power level may be compared to the threshold power level to determine if the second battery or power level for the vehicle 101 has fallen to a level that is equal to or within a predetermined amount of the threshold power level.

At 460, a determination may be made that the current battery or power level (e.g., the second battery or power level) for the vehicle 101 does not satisfy the threshold power level. For example, the computer 105 (e.g., the power level evaluator 117) or the computing device 130 may determine that the second battery or power level does not satisfy the threshold power level. For example, the determination may be based on the comparison of the second battery or power level to the threshold power level. For example, the second battery or power level may not satisfy the threshold power level when the second battery or power level is less than or equal to (or within a predetermined amount of) the threshold power level. In other examples, it may be determined that the second battery or power level satisfies the threshold power level, in which the threshold power level is satisfied when the second battery or power level is equal to (or within a predetermined amount of) or less than the threshold power level. For example, the second battery or power level for the vehicle 101 may be the current battery level.

At 465, a second operational command may be executed at the vehicle 101. For example, the computer 105 may execute the second operational command. In another example, the computing device 130 may cause the second operational command to be executed at the vehicle by sending a second command request to the vehicle 101 via the network 132. The vehicle 101 (e.g., the computer 105) may receive the second command request and, in response, execute the second operational command at the vehicle 101.

For example, the second operational command may be executed based on the determination that the battery or power level for the vehicle 101 does not satisfy the threshold power level. For example, the operational command may be one or more of an alarm signal (e.g., one or more of a warning signal light, sound, vibration, or any combination thereof), a timer (e.g., a countdown timer), or disabling of a feature of the vehicle 101 (e.g., disabling one or more non-driving features or non-driving modes of the vehicle). The non-driving features or non-driving modes of the vehicle 101 may comprise a bucket lift, a garbage compactor, a crane, a vacuum, a street sweeper, a lift, an elevator, a mixer, or a crop harvester. For example, executing the second operational command may include activating the alarm signal. For example, executing the second operational command may include activating the countdown timer. The countdown timer may have a predetermined or variable amount of time on it and may count down from that time until an operator of the vehicle 101 turns off the time or the timer runs out. For example, the second operational command may be to disable one or more non-driving features or modes of the vehicle 101. For example, disabling one or more of the non-driving features or non-driving modes of the vehicle 101 may comprise disabling the one or more non-driving features or modes via the vehicle control system 124 or sending a signal to the vehicle control system 124 to the non-driving feature or mode.

The second operational command may alert an operator of the vehicle 101 that the current battery level does not satisfy the threshold power level. The second operational command may act as a warning, informing the operator that the battery level of the vehicle 101 is currently low and that the electrically-powered motor of the vehicle 101 may require a charge. The second operational command may alert the operator that certain features or modes of the vehicle 101 (e.g., non-driving features or modes) are shutting down due to an insufficient battery level remaining in the electrically-powered motor based on the current battery level not satisfying the threshold power level.

Figure 5:
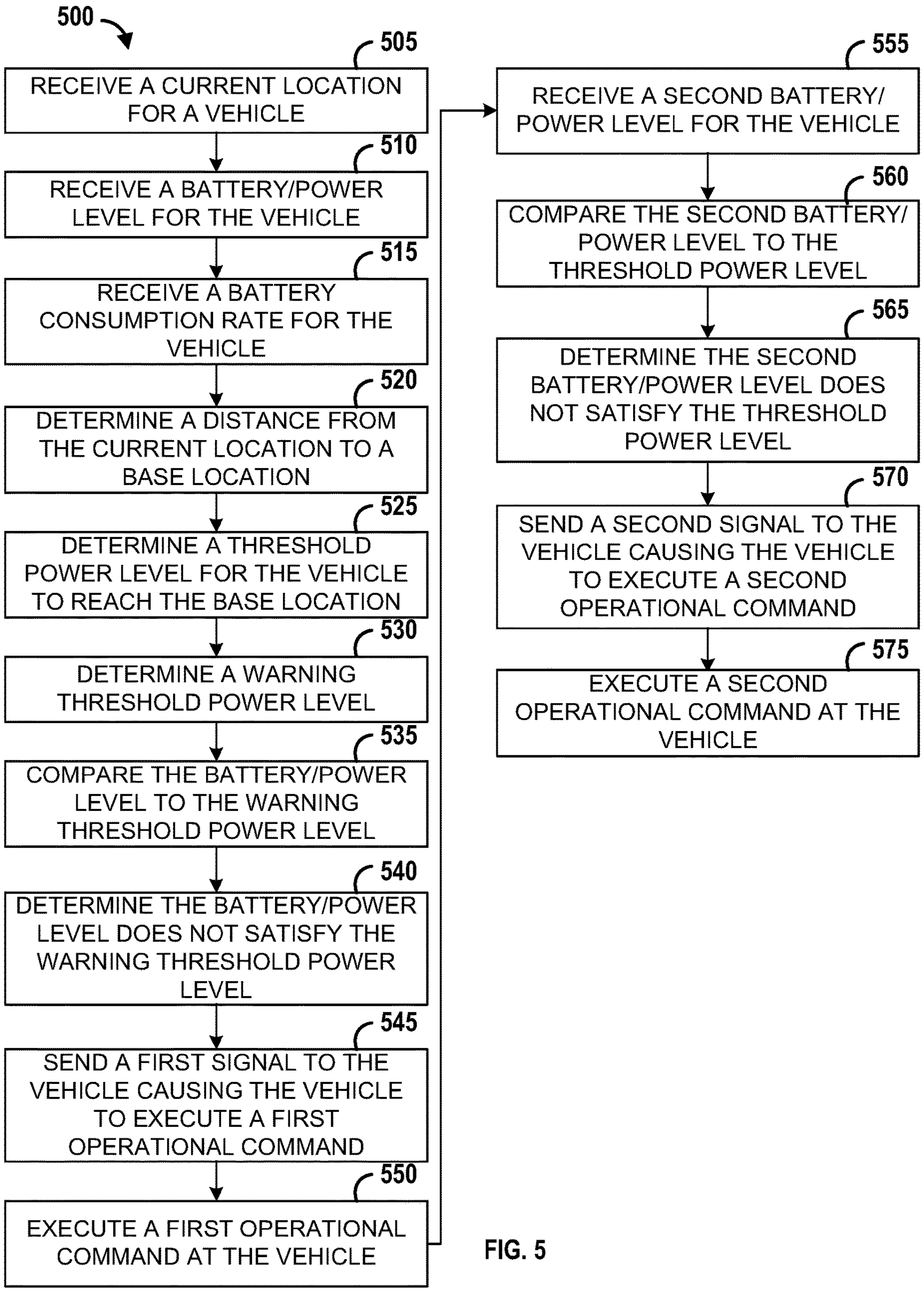
FIG. 5 is a flowchart of another example method for power management of the vehicle.

FIG. 5 is a flowchart illustrating another example method 500 for power management of a vehicle 101. At 505, the current location 203 of the vehicle 101 may be received. For example, the computing device 130 may request and/or otherwise receive the current location 203 from the vehicle 101. For example, the computer 105 may receive the current location information for the vehicle 101 from the GPS device 107 in communication with the satellite 109. The computer 105 may send or otherwise transmit the current location 203 for the vehicle 101 to the computing device 130 via the network 132. For example, the satellite 109 may dynamically update the GPS device 107 with the current location of the vehicle 101. For example, the current location 203 may be sent to the computing device 130 with a vehicle identifier (e.g., the vehicle identification number, license tag, or other unique identifier for the vehicle 101. The computing device 130 may store the current location in a data record associated with the vehicle identifier.

At 510, a battery level, or a power level, for the vehicle 101 may be received. For example, the computing device 130 may request and/or otherwise receive the battery or power level from the vehicle 101. For example, the computer 105 may determine the battery or power level for the vehicle 101 (e.g., from the vehicle information 116). For example, the battery or power level for the vehicle 101 may be indicated by the battery level monitor of the vehicle 101. The computer 105 may send or otherwise transmit the current battery or power level for the vehicle 101 to the computing device 130 via the network 132. For example, the battery or power level may be sent to the computing device 130 with the vehicle identifier for the vehicle 101, The computing device 130 may store the battery or power level in a data record associated with the vehicle identifier.

At 515, a battery consumption rate for the vehicle 101 is received. For example, the computing device 130 may request and/or otherwise receive the battery consumption rate from the vehicle 101. For example, the computer 105 may determine the battery consumption rate for the vehicle 101 (e.g., from the vehicle information 116 and/or power level evaluator 117). The computer 105 may send or otherwise transmit the battery consumption rate for the vehicle 101 to the computing device 130 via the network 132. For example, the battery consumption rate may be sent to the computing device 130 with the vehicle identifier for the vehicle 101. The computing device 130 may store the battery consumption rate in a data record associated with the vehicle identifier. In another example, the computing device 130 may determine the battery consumption rate itself based on the received battery or power level, a maximum battery or power level for the vehicle 101, and a driven distance for the vehicle since the last recharging of the battery system, which may also be received from the vehicle 101 via the network 132. For example, the battery consumption rate may comprise the amount of battery power used for a driven distance 211 for the vehicle 101. For example, the battery consumption rate may be expressed in the amount of kilowatt hours of battery power used per mile the vehicle 101 has been driven.

For example, the computing device 130 may determine an amount of kilowatt hours consumed by the vehicle 101 since the vehicle's last charge by taking a difference of the total kilowatt hours available in the battery system of the vehicle 101 when fully charged and the current kilowatt hours available in the battery system of the vehicle 101 as indicated in the received battery or power level of the vehicle 101. For example, the amount of kilowatt hours consumed by the vehicle 101 may be adjusted based on the amount of kilowatt hours consumed by non-driving mode features of the vehicle 101. For example, the kilowatt hours consumed by non-driving move features of the vehicle 101 may be subtracted from the amount of kilowatt hours consumed. The computing device 130 may calculate the battery consumption rate by dividing the amount of kilowatt hours consumed by the vehicle 101 since the vehicle's last charge by the driven distance since the vehicle's last charge.

At 520, a distance from the current location 203 of the vehicle 101 to a base location 205 may be determined. For example, the distance may be determined by the computing device 130. For example, the distance between the current location 203 and the base location 205 may be determined based on the straight-line distance 207 between the current location 203 and the base location 205 or based on a determined route (e.g., a street route or driving distance using the street route) 209 between the current location 203 and the base location 205.

For example, determining the distance between the current location 203 and the base location 205 based on the straight-line distance may include determining the straight-line distance 207 and adjusting the determined straight-line distance 207 by a distance safety factor. The distance safety factor may be one or more of a predetermined distance (e.g., a mile, 5 miles, etc.) that is added to the determined straight-line distance 207, a percentage (e.g., 150%, 200%, etc.) that is multiplied by the straight-line distance 207, or a factor value (e.g., 1.5, 1.75) that is multiplied by the straight line distance 207, to determine the distance. The distance safety factor may be fixed or variable. For example, the distance safety factor may be based on the amount of the straight-line distance. For example, as the straight-line distance increases, the distance safety factor may change (e.g., increase).

For example, determining the distance between the current location 203 and the base location 205 based on the determined route 209 may include determining a driving route 209 from the current location 203 to the base location 205. The driving route may be determined by the computing device 130. The driving route 209 may be one of many optional driving routes and may be determined based on any number of factors, such as any one or more of the shortest route, the fastest route, the route with the fewest stop lights or stop signs, the route with the fewest turns, the route that avoids certain areas (e.g., residential areas), etc. For example, the distance may be the determined driving route distance 209. In other examples, the determined driving route distance 209 may be adjusted by a distance safety factor. For example, the distance safety factor for the determined driving route 209 may be the same or different from the distance safety factor for a determined straight-line distance 207. For example, the distance safety factor may be one or more of a predetermined distance (e.g., a mile, 5 miles, etc.) that is added to the determined driving route distance 209, a percentage (e.g., 150%, 200%, etc.) that is multiplied by the determined driving route distance 209, or a factor value (e.g., 1.5, 1.75) that is multiplied by the determined driving route distance 209, to determine the distance. The distance safety factor may be fixed or variable. For example, the distance safety factor may be based on the amount of the determined driving route distance 209. For example, as the driving route distance 209 increases, the distance safety factor may change (e.g., increase). For example, the current location 203 and the base location 205 may be utilized to determine the straight-line distance 207 and/or the driving route distance. For example, the determined distance to the base location 205 may be stored in the record associated with the vehicle identifier in the computing device 130.

At 525, a threshold power level for the vehicle 101 to reach the base location 205 from the current location 203 may be determined. For example, the threshold power level may be determined by the computing device 130. For example, the threshold power level may include a minimum amount of power value. For example, the minimum amount of power value may include or be the product of multiplying the battery consumption rate by the determined distance to the base location 205. For example, the determined distance may be determined based on either of the straight line calculation or the route calculation discussed above. For example, the threshold power level may also include a return safety factor value. For example, the return safety factor value may be a value that adjusts or modifies (e.g., increases) the minimum amount of power value. The return safety factor value may be one or more of a predetermined amount of kilowatt hours of battery power (e.g., 1 kwh, 5 kwh, etc.) that is added to the minimum amount of power value, a percentage (e.g., 110%, 130%, etc.) that is multiplied by the minimum amount of power value, or a factor value (e.g., 1.3, 2.5) that is multiplied by the minimum amount of power value, to determine the threshold power level for the vehicle 101 to return to the base location 205 in a driving mode.

At 530, a warning threshold power level may be determined. For example, the warning threshold power level may be determined by the computing device 130. For example, the warning threshold power level may be greater than the threshold power level. For example, the warning threshold power level may indicate an amount of power remaining in the battery system of the vehicle 101 at which a warning, timer, or other action should be initiated at the vehicle 101. For example, the warning threshold power level may be determined based on the minimum amount of power value. For example, the minimum amount of power value may be adjusted or modified by a warning factor value. For example, the warning factor value may be greater than the return safety factor value. For example, the warning factor value may be one or more of a predetermined amount of kilowatt hours of battery power (e.g., 1 kwh, 5 kwh, etc.) that is added to the minimum amount of power value, a percentage (e.g., 150%, 210%, etc.) that is multiplied by the minimum amount of power value, or a factor value (e.g., 1.8, 3.1) that is multiplied by the minimum amount of power value, to determine the warning threshold power level for a warning, timer, or other action to be executed at the vehicle 101.

At 535, the received battery or power level for the vehicle 101 may be compared to the warning threshold power level. For example, the computing device 130 may compare the received battery or power level to the warning threshold power level. For example, the received battery or power level may be compared to the warning threshold power level to determine if the received battery or power level for the vehicle 101 has fallen to a level that is equal to or within a predetermined amount of the warning threshold power level.

At 540, a determination may be made that the current battery or power level for the vehicle 101 does not satisfy the warning threshold power level. For example, the computing device 130 may determine that the battery or power level does not satisfy the warning threshold power level. For example, the determination may be based on the comparison of the battery or power level to the warning threshold power level. For example, the battery or power level may not satisfy the warning threshold power level when the battery or power level is less than or equal to (or within a predetermined amount of) the warning threshold power level. In other examples, it may be determined that the battery or power level satisfies the warning threshold power level, in which the warning threshold power level is satisfied when the battery or power level is equal to (or within a predetermined amount of) or less than the warning threshold power level.

At 545, a first signal or message may be sent to the vehicle 101. The first signal or message may be sent by the computing device 130 to vehicle 101 via the network 132. For example, the first signal or message may be configured to cause the vehicle 101 to execute a first operational command at the vehicle 101. The first signal or message may be received by the vehicle 101 (e.g., by the computer 105) and directed to the vehicle control system 124 to execute the first operational command.

At 550, the first operational command may be executed at the vehicle 101. For example, the first operational command may be executed based on the received first signal or message from the computing device 130. For example, the first operational command may be executed based on the determination that the battery or power level for the vehicle 101 does not satisfy the warning threshold power level. For example, the first operational command may be one or more of an alarm signal (e.g., one or more of a warning light, sound, vibration, or any combination thereof) or a timer (e.g., a countdown timer). For example, executing the first operational command may include activating the alarm signal. For example, executing the first operational command may include activating the countdown timer. The countdown timer may have a predetermined or variable amount of time on it and may count down from that time until an operator of the vehicle 101 turns off the timer or the timer runs out. For example, when the timer runs out, another operational command may be executed.

In certain examples, the operator of the vehicle 101 may override or deactivate the action initiated by the first operational command. For example, the alarm signal may be deactivated or paused or the timer may be paused or deactivated in response to an operator input at the vehicle 101. In certain examples, when the operator overrides or deactivates the action initiated by the first operational command (e.g., the alarm signal, timer, or deactivation of a non-driving feature or mode of the vehicle 101), the computer 105 may send an indication of the operator input to the computing device 130 via the network 132 for recordation a the computing device 130. For example, other information related to the operator input may also be sent to the computing device 130 for recording. The other information may comprise an identifier of the operator, the vehicle identifier, a time/date reference of the operator input, the action that was overridden, the battery or power level for the vehicle 101, the distance to the location 205, the warning threshold power level, and/or the threshold power level. The information may be stored at the computing device 130 in a record associated with the vehicle identifier.

At 555, a second battery or power level for the vehicle 101 may be received. For example, the computing device 130 may request and/or otherwise receive the second battery or power level from the vehicle 101. For example, the computer 105 may determine the second battery or power level for the vehicle 101 (e.g., from the vehicle information 116). The computer 105 may send or otherwise transmit the second battery or power level for the vehicle 101 to the computing device 130 via the network 132. For example, the second battery or power level may be sent to the computing device 130 with the vehicle identifier for the vehicle 101. The second battery or power level may indicate the current battery or power level for the vehicle at a time subsequent to receiving the battery or power level at 510. The computing device 130 may store the second battery or power level in a data record associated with the vehicle identifier.

At 560, the second battery or power level may be compared to the threshold power level. For example, the computing device 130 may compare the second battery or power level to the threshold power level. For example, the second battery or power level may be compared to the threshold power level to determine if the second battery or power level for the vehicle 101 has fallen to a level that is equal to or within a predetermined amount of the threshold power level.

At 565, a determination may be made that the current battery or power level (e.g., the second battery or power level) for the vehicle 101 does not satisfy the threshold power level. For example, the computing device 130 may determine that the second battery or power level does not satisfy the threshold power level. For example, the determination may be based on the comparison of the second battery or power level to the threshold power level. For example, the second battery or power level may not satisfy the threshold power level when the second battery or power level is less than or equal to (or within a predetermined amount of) the threshold power level. In other examples, it may be determined that the second battery or power level satisfies the threshold power level, in which the threshold power level is satisfied when the second battery or power level is equal to (or within a predetermined amount of) or less than the threshold power level.

At 570, a second signal or message may be sent to the vehicle 101. The second signal or message may be sent by the computing device 130 to vehicle 101 via the network 132. For example, the second signal or message may be configured to cause the vehicle 101 to execute a second operational command at the vehicle 101. The second signal or message may be received by the vehicle 101 (e.g., by the computer 105) and directed to the vehicle control system 124 to execute the second operational command.

At 575, the second operational command may be executed at the vehicle 101. For example, the second operational command may be executed based on the received second signal or message from the computing device 130. For example, the second operational command may be executed based on the determination that the second battery or power level for the vehicle 101 does not satisfy the threshold power level. For example, the second operational command may be one or more of an alarm signal (e.g., one or more of a warning light, sound, vibration, or any combination thereof), a timer (e.g., a countdown timer), or disabling of a feature of the vehicle 101 (e.g., disabling one or more non-driving features or non-driving modes of the vehicle). For example, the non-driving features or non-driving modes of the vehicle 101 may comprise a bucket lift, a garbage compactor, a crane, a vacuum, a street sweeper, a lift, an elevator, a mixer, or a crop harvester. For example, executing the second operational command may include one or more of activating the alarm signal, activating the countdown timer, or disabling one or more non-driving features or modes of the vehicle 101.

The second operational command may alert an operator of the vehicle 101 that the second battery level does not satisfy the threshold power level. The second operational command may act as a warning, informing the operator that the battery level of the vehicle 101 is currently low and that the electrically-powered motor of the vehicle 101 may require a charge. The second operational command may alert the operator that certain features or modes of the vehicle 101 (e.g., non-driving features or modes) are shutting down due to an insufficient battery level remaining in the electrically-powered motor based on the current battery level not satisfying the threshold power level.

Figure 6A:
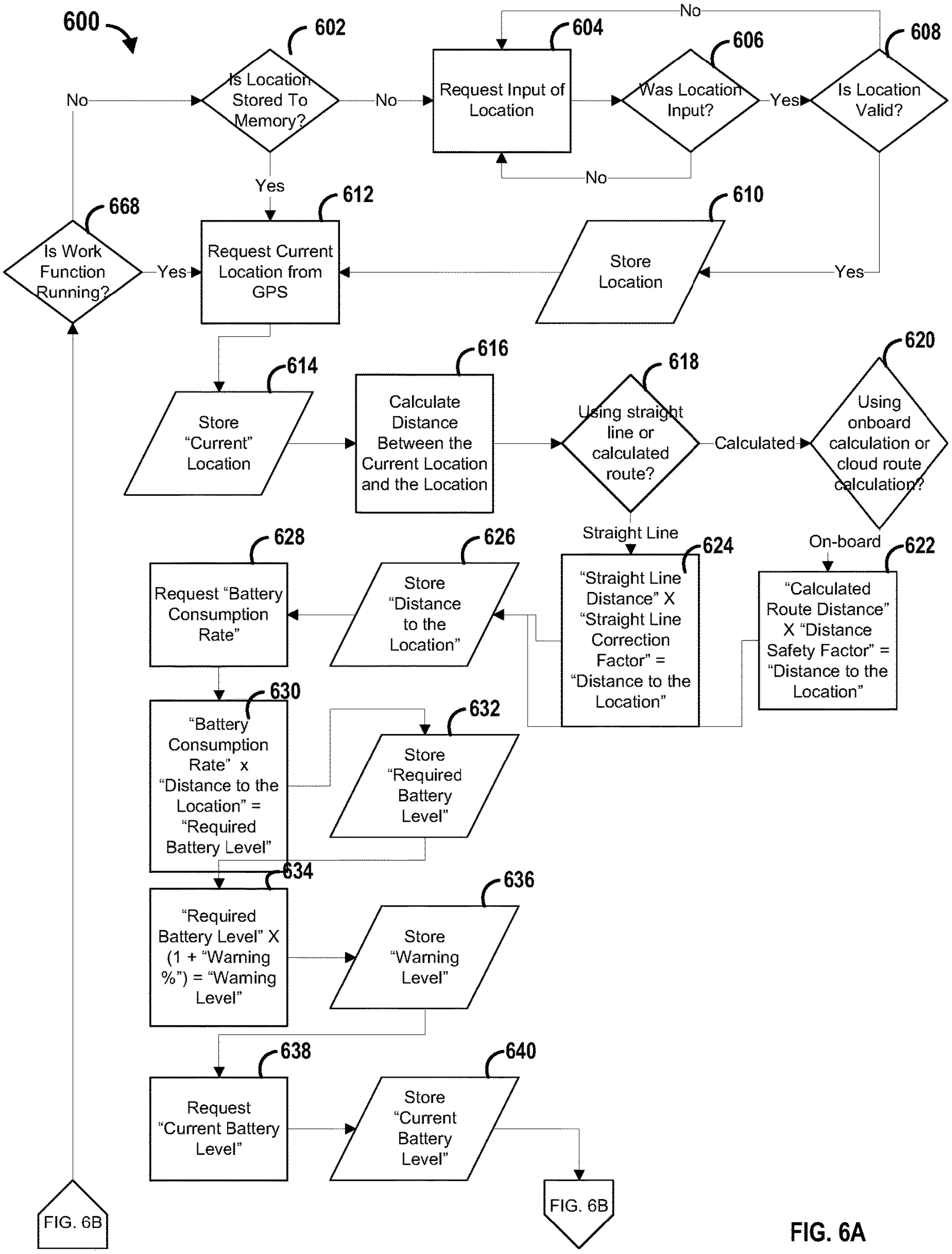
FIGS. 6A and 6B are a flowchart of another example method for power management of the vehicle.
Figure 6B:
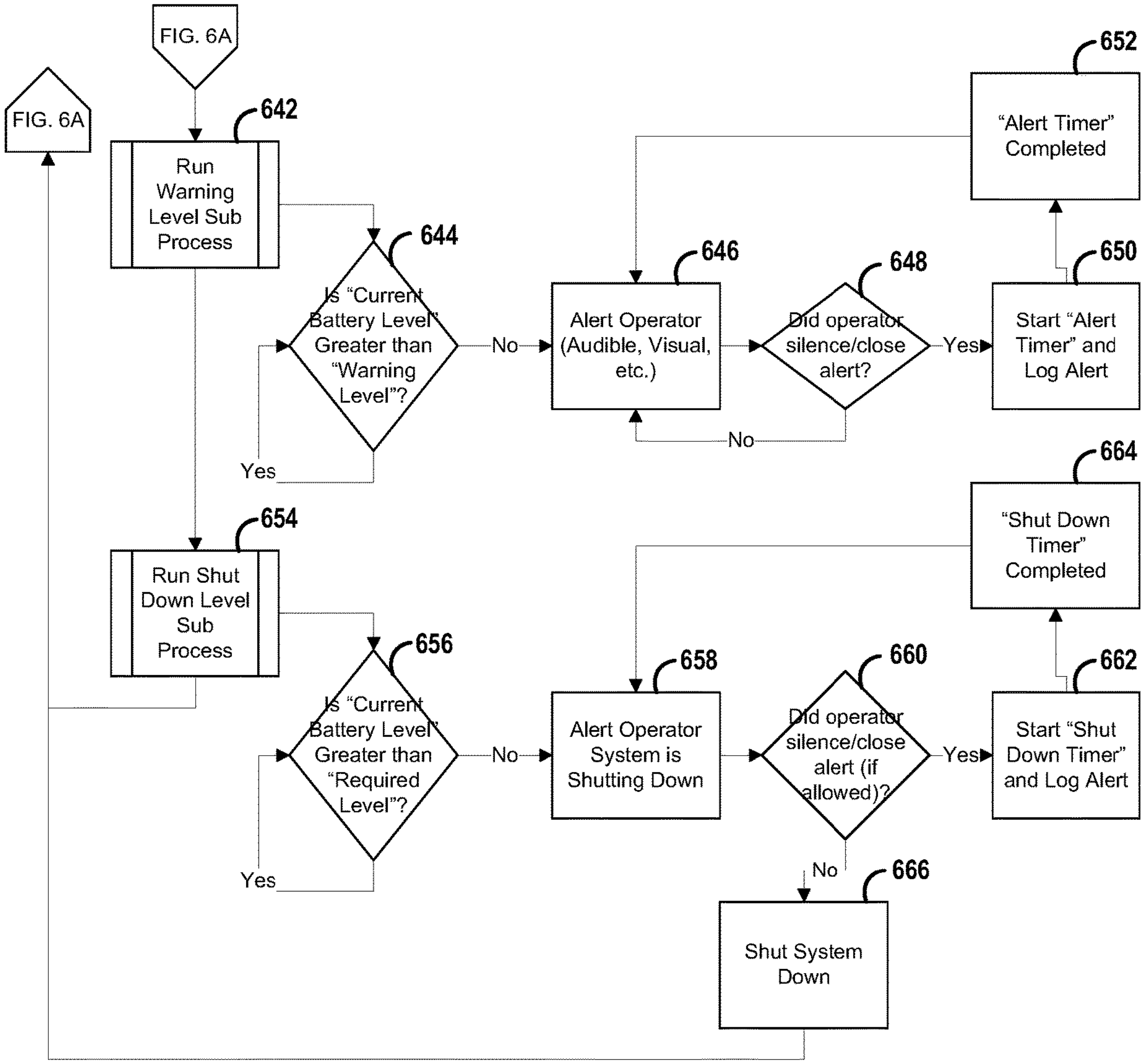

FIGS. 6A and 6B are flowcharts illustrating another example method 600 for power management of a vehicle 101. At 602, an inquiry is conducted to determine if the location 205 (e.g., the base location) for the vehicle 101 is stored in memory. For example, the location 205 may be preprogrammed within the mapping and location module 115 and/or the vehicle information 116) of the computer 105 or within a database (not shown) associated with the computing device 130. The location 205 may be the home location for the vehicle 101 and may comprise a charging station for charging an electrically-powered motor of the vehicle 101. In other examples, the location 205 may correspond to an alternative location which the vehicle 101 may identify as a charging station that may be used by the vehicle 101. If the location 205 is stored in memory, the YES branch may be followed to 612. Otherwise the NO branch is followed to 604.

At 604, input of the location 205 may be requested. For example, input of the location 205 may be requested by the computer 105 or the computing device 130 at the vehicle 101. For example, an operator of the vehicle 101 may input the location 205 into the input/output interface 120 of the computer 105. The location 205 may be an address, coordinates, a location on a map, or any other information indicating a particular geo-position.

Until the location 205 has been input to satisfy the request from the computer 105 or the computing device 130, the request 604 may keep repeating until verification that the location 205 has been input is received at 606 by the computer 105 or the computing device 130.

At 608, an inquiry is conducted to determine if the input location 205 is valid. For example, the computer 105 may request verification from the operator of the vehicle 101 that the location input is valid. Verification may comprise the operator confirming the input location 205 is correct. If the location 205 is valid, the YES branch may be followed to 610. Otherwise, the NO branch may be followed back to 604 to request input of the location 205.

Once the input location 205 is determined to be valid at 608, the location 205 may be stored at 610. For example, the location 205 may be stored in the mass storage device 113 (e.g., the mapping and location module 115) of the computer 105 or in memory associated with the computing device 130.

At step 612, the current location 203 may be requested for the vehicle. For example, the current location 203 may be requested by the computer 105 or the computing device 130. For example, the current location 203 may be requested from the GPS device 107 in communication with the satellite 109. The current location 203 of the vehicle 101 may be determined from the communication received from the GPS device 107.

At step 614, the current location 203 may be stored. For example, the current location 203 for the vehicle 101 may be stored in the mass storage device 113 (e.g., the mapping and location module 115) of the computer 105 or in memory associated with the computing device 130.

At step 616, a distance between the current location 203 and the location 205 may be calculated. For example, the distance between the current location 203 and the location 205 may be calculated based on the straight-line distance 207 between the current location 203 and the location 205 at 618 or based on a particular route 209 between the current location 203 and the location 205 at 620.

At 618, the distance between the current location 203 and the location 205 may be calculated using the straight-line distance 207 between the current location 203 and the location. At 624, the straight-line distance 207 may be adjusted using a straight-line correction factor. The straight-line correction factor may be one or more of a predetermined distance (e.g., a mile, 5 miles, etc.) that is added to the determined straight-line distance 207, a percentage (e.g., 150%, 200%, etc.) that is multiplied by the straight-line distance 207, or a factor value (e.g., 1.5, 1.75) that is multiplied by the straight line distance 207, to determine the distance.

At 620, the distance between the current location 203 and the location 205 may be calculated using the vehicle routes distance 209. The vehicle route distance 209 may be the distance the vehicle 101 would need to travel along a particular route from the current location 203 to the location 205. For example, the GPS device 107 may be utilized to determine the straight-line distance and/or the vehicle route distance. The route and thus the vehicle route distance may be determined by the computer 105 (e.g., an onboard calculation) or the computing device 130 (e.g., a cloud route calculation). At 622, the vehicle route distance 209 may be adjusted using a distance safety factor. The distance safety factor may be one or more of a predetermined distance (e.g., a mile, 5 miles, etc.) that is added to the vehicle route distance 209, a percentage (e.g., 150%, 200%, etc.) that is multiplied by the vehicle route distance 209, or a factor value (e.g., 1.5, 1.75) that is multiplied by the vehicle route distance 209, to determine the distance.

At 626, the calculated distance may be stored. For example, the calculated distance may be stored in the mass storage device 113 (e.g., the vehicle information 116) of the computer 105 or in memory associated with the computing device 130.

At 628, a battery consumption rate for the vehicle 101 may be requested. For example, the battery consumption rate may be requested by the computer 105 or the computing device 130. For example, the battery consumption rate may be determined by the computer 105 or the computing device 130. For example, the battery consumption rate may comprise the amount of battery power used for a driven distance 211 for the vehicle 101. For example, the battery consumption rate may be expressed in the amount of kilowatt hours of battery power used per mile the vehicle 101 has been driven.

For example, the computer 105 or the computing device 130 (e.g., via the power level evaluator 117) may determine the current battery level for the vehicle 101. For example, an amount of kilowatt hours consumed by the vehicle 101 since the vehicle's last charge may be determined, by the computer 105 or the computing device 130, by taking a difference of the total kilowatt hours available in the battery system of the vehicle 101 when fully charged and the current kilowatt hours available in the battery system of the vehicle 101 (e.g., based on the current battery level). The amount of kilowatt hours consumed by the vehicle 101 may be adjusted based on the amount of kilowatt hours consumed by non-driving mode features of the vehicle 101. For example, the kilowatt hours consumed by non-driving move features of the vehicle 101 may be subtracted from the amount of kilowatt hours consumed.

The computer 105 or the computing device 130 (e.g., via the mapping and location module 115 or a trip odometer) may also determine the driven distance for the vehicle 101 since the last time the vehicle's battery was charged. For example, the driven distance may be the driving distance 211 from the location 205 to the current location 203 of the vehicle 101. For example, the computer 105 or the computing device 130 may calculate the battery consumption rate by dividing the amount of kilowatt hours consumed by the vehicle 101 since the vehicle's last charge by the driven distance since the vehicle's last charge.

At 630, a required battery level for the vehicle 101 to travel the calculated distance may be determined. For example, the required battery level may be calculated by multiplying the battery consumption rate by the distance to the location 205. For example, the required battery level may be calculated by the computer 105 (e.g., the power level evaluator 117) or the computing device 130.

At 632, the calculated required battery level may be stored. For example, the calculated required battery level may be stored in the mass storage device 113 (e.g., the vehicle information 116) of the computer 105 or in memory associated with the computing device 130.

At 634, a warning level is calculated. For example, the warning level may be calculated by the computer 105 (e.g., the power level evaluator 117) or the computing device 130. For example, the warning level may be calculated by multiplying the required battery level by one plus a warning percentage. In other examples, the warning percentage level may be added to any number in the calculation of the warning level. The warning percentage may be indicative of any percentage level corresponding to a warning.

At 636, the warning level may be stored. For example, the warning level may be stored in the mass storage device 113 (e.g., the vehicle information 116) of the computer 105 or in memory associated with the computing device 130.

At 638, the current battery level for the vehicle 101 may be requested or determined. For example, the current battery level may be requested or determined by the computer 105 or the computing device 130. For example, the battery level for the vehicle 101 may be expressed in the amount of kilowatt hours of power remaining in the battery system for the vehicle 101. For example, the battery level for the vehicle 101 may be the current battery level for the vehicle 101. For example, the current battery level for the vehicle 101 may be indicated by a battery level monitor of the vehicle 101.

At 640, the current battery level may be stored. For example, the current battery level for the vehicle 101 may be stored in the mass storage device 113 (e.g., the vehicle information 116) of the computer 105 or in memory associated with the computing device 130.

At 642, a warning alert sub-process may be executed. For example, the warning alert sub-process may be executed by the computer 105 or the computing device 130. For example, at 644, a determination can be made as to whether the current battery level is greater than the warning level. If the current battery level is greater than the warning level, then the YES branch may loop back to 642 for continued comparison. If the current batter level is not greater than the warning level (e.g., less than or equal to the warning level, then the NO branch may be followed to 646.

At 646, the operator of the vehicle 101 may be alerted. For example, the alert may be a warning indicating that the battery level for the electrically-powered motor of the vehicle 101 is currently low in view of the distance to the location 205, and that the vehicle battery system may require a charge soon. For example, the operator of the vehicle 101 may be alerted by executing an operational command at the vehicle 101. For example, the operational command may be a first operational command and may be an alarm signal (e.g., one or more of a warning light, sound, vibration, or any combination thereof). For example, executing the first operational command may include activating the alarm signal.

At 648, a determination may be made as to whether the operator of the vehicle 101 acknowledged, silenced, closed, or otherwise deactivated the alert (e.g., the alarm signal). For example, the operator of the vehicle 101 may provide an operator input to the computer 105 or to an element communicably coupled to the computer 105 to deactivate, silence, or close the alert. For example, the operator input may be a push-button or switch that the operator may manually engage to provide the operator input. If the operator did not silence or deactivate the alert, the NO branch may be followed back to 646. If the operator did silence or deactivate the alert, the YES branch may be followed to 650.

At 650, an alert time may be started. For example, a countdown timer may be activated. The countdown timer may have a predetermined or variable amount of time on it and may count down from that time until an operator of the vehicle 101 turns off the timer or the timer runs out at 652. For example, when the timer runs out, another operational command may be executed. In addition, the alert and the deactivation of the alert may be stored for record-keeping purposes. For example, the computer 105 or computing device 130 may store a record of the operator input. For example, other information related to the operator input may also be recorded by the computer 105 or sent to the computing device 130 for recording. The other information may comprise an identifier of the operator, an identifier of the vehicle, a time/date reference, the action that was overridden, the battery or power level for the vehicle 101, the distance to the location 205, the warning threshold power level, and/or the threshold power level. The alert may be logged or stored for subsequent evaluation of the operator's proper action. For example, once the timer has completed, at 652, the method may return to 646, where the operator is alerted again of the low status of the current battery level of the vehicle 101.

At 654, a shutdown alert sub-process may be executed. For example, the shutdown alert sub process may be completed by the computer 105 or the computing device 130. For example, the shutdown alert sub-process may act as a second operational command. At 656, a determination may be made regarding whether the current battery level for the vehicle 101 is greater than required battery level. For example, the required battery level may be the amount of battery power for the vehicle 101 to travel to the location 205 in a drive-only mode (e.g., not operating in a drive mode and non-driving mode simultaneously or switching between the drive mode and non-driving mode intermittently between the current location 203 and the location 205), with optionally the distance safety factor or straight-line correction factor included, as discussed above. If the current battery level is determined to be greater than the required battery level, then the YES branch may loop back to 656 to continue, either continuously or periodically, to compare the current battery level to the required battery level. If the current battery level is determined to not be greater than the required battery level (e.g., less than or equal to), then the NO branch may be followed to 658.

At 658, the operator of the vehicle 101 may be alerted. For example, the alert may be a warning indicating that the battery level for the electrically-powered motor of the vehicle 101 is currently low in view of the distance to the location 205, and that the vehicle battery system may require a charge soon. For example, the operator of the vehicle 101 may be alerted by executing an operational command at the vehicle 101. For example, the operational command may be a second operational command and may be an alarm signal (e.g., one or more of a warning light, sound, vibration, or any combination thereof). For example, executing the second operational command may include activating the alarm signal.

At 660, a determination may be made as to whether the operator of the vehicle 101 acknowledged, silenced, closed, or otherwise deactivated the alert (e.g., the alarm signal), if allowed to do so. For example, the operator of the vehicle 101 may provide an operator input to the computer 105 or to an element communicably coupled to the computer 105 to deactivate, silence, or close the alert. If the operator did not silence or deactivate the alert, the NO branch may be followed to 666, where the non-driving mode and/or non-driving feature of the vehicle 101 may be shut down and prevented from being further used. Shutting down the non-driving mode or feature of the vehicle may not affect the ability of the vehicle 101 from being driven (e.g., the drive mode of the vehicle 101) but may prevent the use of the non-driving mode or feature of the vehicle 101 from being used until the battery system of the vehicle is recharged to a predetermined level. Examples of non-driving features of a vehicle 101 include, but are not limited to, a crane, a harvester device, a bucket lift, a compactor (e.g., for compacting garbage or other materials), a vacuum, a street sweeping device, a lift or elevator, a mixer, etc. Examples of non-driving modes for the vehicle 101 include, but are not limited to, a bucket lifting operation, a compacting operation, a crane operation, a harvesting operation, a vacuuming operation, a street sweeping operation, a lifting operation, an elevator operation, a mixing operation, etc. If the operator did silence or deactivate the alert, the YES branch may be followed to 662.

At 662, based on the operator silencing or deactivating the alarm, a timer is begun and the alert is logged. For example, a countdown timer may be activated that has a predetermined or variable amount of time on it and may count down from that time until an operator of the vehicle 101 turns off the timer or the timer runs out at 652. For example, when the timer runs out, another operational command may be executed. The computer 105 or computing device 130 may log or store a record of the operator input. For example, other information related to the operator input may also be recorded by the computer 105 or sent to the computing device 130 for recording. The other information may comprise an identifier of the operator, an identifier of the vehicle, a time/date reference, the action that was overridden, the battery or power level for the vehicle 101, the distance to the location 205, the warning threshold power level, and/or the threshold power level. The alert may be logged or stored for subsequent evaluation of the operator's proper action. For example, once the timer has completed, at 664, the method may return to 658, where the operator is alerted again of the insufficient status of the current battery level of the vehicle 101.

At 668, a determination is made regarding whether a non-driving mode or non-driving feature (e.g., a work function) for the vehicle 101 is running. The determination may be made by the computer 105 or the computing device 130. If a work function for the vehicle 101 is running, the process 600 follows the YES branch to 612. If, however, it has been determined that the work function is not running, the process 600 repeats and the NO branch may be followed to 602.

While the methods and systems have been described in connection with example embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
- determining a distance from a vehicle to a location;
- determining, based on the distance, a threshold power level for the vehicle to move to the location;
- determining that a battery level for the vehicle does not satisfy the threshold power level; and
- executing, based on the battery level not satisfying the threshold power level, an operational command at the vehicle, wherein executing the operational command at the vehicle comprises initiating a countdown timer at the vehicle that provides an audible or visible indication of when a non-driving mode of the vehicle will be disabled and disabling the non-driving mode of the vehicle.

2. The method of claim 1, further comprising:
- determining a battery consumption rate for the vehicle, wherein determining the threshold power level for the vehicle comprises determining, based on the distance and the battery consumption rate, the threshold power level.

3. The method of claim 1, wherein determining the threshold power level for the vehicle to move to the location comprises:
- determining, a minimum amount of power value for the vehicle to travel the distance; and
- modifying the minimum amount of power value by a return safety factor value.

4. The method of claim 1, further comprising:
- determining, based on the threshold power level, a warning threshold power level for the vehicle;
- determining that the battery level for the vehicle does not satisfy the warning threshold power level; and
- executing, based on the battery level not satisfying the warning threshold power level, a second operational command at the vehicle.

5. The method of claim 1, further comprising:
- determining, a time on the timer has expired; and
- disabling, based on the time on the timer expiring, the non-driving mode of the vehicle.

6. The method of claim 1, wherein the non-driving mode comprises at least one of a bucket lift, a garbage compactor, a crane, a vacuum, a street sweeper, a lift, an elevator, a mixer, or a harvester.

7. The method of claim 1, wherein executing the operational command further comprises sending the operational command to the vehicle.

8. The method of claim 1, wherein determining the distance comprises:
- determining a current location for the vehicle;
- determining a straight-line distance from the current location to the location; and
- determining the distance by modifying the straight-line distance based on a distance safety factor.

9. The method of claim 1, wherein determining the distance comprises:
- determining a current location for the vehicle; and
- determining a driving distance from the current location to the location.

10. The method of claim 1, further comprising determining that the vehicle is operating in the non-driving mode, wherein executing the operational command at the vehicle further comprises disabling the non-driving mode on the vehicle.

11. A method comprising:
- determining a vehicle is operating in a non-driving mode;
- determining a threshold power level for the vehicle to drive to a location;
- determining, based on a current amount of battery power for the vehicle, that the current amount of battery power for the vehicle does not satisfy the threshold power level;
- initiating, based on the current amount of battery power for the vehicle not satisfying the threshold power level, a countdown timer at the vehicle that provides an audible or visible indication of when the non-driving mode of the vehicle will be disabled;
- determining, a time on the timer has expired; and
- disabling, based on the time on the countdown timer expiring, the non-driving mode of the vehicle.

12. The method of claim 11, further comprising at least one of disabling the non-driving mode of the vehicle or generating a warning signal.

13. The method of claim 11, wherein determining the vehicle is operating in the non-driving mode further comprises determining the vehicle is simultaneously operating in a driving mode and the non-driving mode.

14. The method of claim 11, wherein determining the threshold power level comprises:

determining a current location for the vehicle;

determining, based on the current location, a distance to the location for the vehicle;

determining a battery consumption rate for the vehicle in a driving mode; and determining, based on the distance and the battery consumption rate, the threshold power level for the vehicle.

15. The method of claim 11, wherein the non-driving mode of the vehicle comprises at least one of a bucket lifting operation, a compacting operation, a crane operation, a vacuum operation, a street sweeping operation, a lifting operation, an elevator operation, a mixing operation, or a harvesting operation.

16. A method comprising:

receiving a current location, a battery level, and a battery consumption rate for a vehicle;

determining, based on the current location, a distance for the vehicle to move to a base location;

determining, based on the distance and the battery consumption rate, a threshold power level for the vehicle to move to the base location;

determining, based on the battery level, that the battery level for the vehicle does not satisfy the threshold power level;

sending, based on the battery level not satisfying the threshold power level, an operational command to the vehicle initiating a countdown timer at the vehicle that provides an audible or visual indication of when a non-driving mode capability of the vehicle will be disabled; and disabling, based on the countdown timer expiring, the non-driving mode capability of the vehicle.

17. The method of claim 16, wherein sending the operational command further causes the vehicle at least one of generate a warning associated with the non-driving mode capability of the vehicle.

18. The method of claim 16, wherein determining the threshold power level for the vehicle to move to the base location comprises:

determining, based on the distance and the battery consumption rate, a minimum amount of power value for the vehicle to travel the distance; and modifying the minimum amount of power value by a return safety factor value.

19. The method of claim 16, wherein determining the distance comprises:

determining the current location for the vehicle;

determining a straight-line distance from the current location to the base location; and determining the distance by modifying the straight-line distance based on a distance safety factor.

* * * * *